United States Patent
Chen et al.

(10) Patent No.: US 11,958,440 B2
(45) Date of Patent: Apr. 16, 2024

(54) VEHICLE INTERIOR COMPONENT

(71) Applicant: Shanghai Yanfeng Jinqiao Automotive Trim Systems Co. Ltd., Novi, MI (US)

(72) Inventors: Tao Chen, Shanghai (CN); Jiandong Yu, Shanghai (CN); Yan Gao, Shanghai (CN)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 737 days.

(21) Appl. No.: 17/110,809

(22) Filed: Dec. 3, 2020

(65) Prior Publication Data
US 2021/0086699 A1   Mar. 25, 2021

Related U.S. Application Data

(63) Continuation of application No. PCT/CN2019/095117, filed on Jul. 8, 2019.

(30) Foreign Application Priority Data

Jul. 10, 2018 (CN) .......................... 201810749195.8

(51) Int. Cl.
*B60R 7/04* (2006.01)
(52) U.S. Cl.
CPC ...................................... *B60R 7/04* (2013.01)
(58) Field of Classification Search
CPC ... B60R 7/04; B60R 2011/0007; B60N 3/001; B60N 3/10

(Continued)

(56) References Cited

U.S. PATENT DOCUMENTS 4,722,573 A   2/1988   Komohara
6,135,529 A   10/2000   De Angelis et al.
(Continued)

FOREIGN PATENT DOCUMENTS

CA   2245311 C   10/2006
CN   1810538 A   8/2006
(Continued)

OTHER PUBLICATIONS

First Search from the State Intellectual Property Office of the People's Republic of China for CN Patent Application No. 201810749195.8 (English translation) (2 pages).

(Continued)

*Primary Examiner* — Dennis H Pedder

(57) ABSTRACT

A vehicle interior component is disclosed. The component may comprise a track and a console configured to latch to the track and unlatch from the track to move along the track. The component may comprise a drive mechanism comprising a motor, a first cable to move the console forward and a second cable to move the console rearward. The component may comprise a controller and a retaining mechanism comprising an actuator and a lock mechanism. The controller may send a signal to the actuator to actuate the lock mechanism and may send a signal to the drive mechanism to move the console. The actuator may be configured to move a pin into engagement with a hole in the track to secure the console to the track. The lock mechanism may comprise a set of pins configured to engage a set of holes in the track.

19 Claims, 8 Drawing Sheets

(58) Field of Classification Search
USPC .............................................. 296/24.34, 37.8
See application file for complete search history.

(56) References Cited

U.S. PATENT DOCUMENTS

| | | | |
|---|---|---|---|
| 6,203,088 B1 | 3/2001 | Fernandez et al. | |
| 6,726,267 B2 | 4/2004 | Kim et al. | |
| 6,921,118 B2 | 7/2005 | Clark et al. | |
| 6,986,493 B2 * | 1/2006 | Yokota | B60N 2/067 |
| | | | 248/424 |
| 7,152,897 B2 | 12/2006 | Bonnes et al. | |
| 7,156,438 B2 | 1/2007 | Cowelchuk et al. | |
| 7,186,118 B2 | 3/2007 | Hansen et al. | |
| 7,354,100 B2 | 4/2008 | Yokomori et al. | |
| 7,401,831 B2 | 7/2008 | Sturt et al. | |
| 7,416,235 B2 | 8/2008 | Rajappa et al. | |
| 7,543,874 B2 | 6/2009 | Ogura et al. | |
| 8,894,120 B2 | 11/2014 | Lechkun et al. | |
| 9,199,553 B2 | 12/2015 | Cuddihy et al. | |
| 9,597,983 B2 | 3/2017 | Strasdat et al. | |
| 11,142,097 B2 * | 10/2021 | Dry | B60R 16/027 |
| 2003/0197392 A1 | 10/2003 | Clark et al. | |
| 2003/0234550 A1 | 12/2003 | Brooks et al. | |
| 2004/0026947 A1 | 2/2004 | Kitano et al. | |
| 2004/0159764 A1 | 8/2004 | Oshima et al. | |
| 2005/0285005 A1 | 12/2005 | Severini | |
| 2006/0231719 A1 | 10/2006 | Kayumi et al. | |
| 2007/0075107 A1 | 4/2007 | Brancheriau et al. | |
| 2008/0067828 A1 | 3/2008 | Sturt | |
| 2008/0303302 A1 | 12/2008 | Sturt et al. | |
| 2016/0152163 A1 | 6/2016 | Strasdat et al. | |
| 2018/0162299 A1 | 6/2018 | Ranganathan et al. | |

FOREIGN PATENT DOCUMENTS

| | | | | |
|---|---|---|---|---|
| CN | 103010061 A | | 4/2013 | |
| CN | 203283068 U | | 11/2013 | |
| CN | 204340739 U | | 5/2015 | |
| DE | 20204623 U1 | | 8/2002 | |
| DE | 10334999 A1 | | 2/2005 | |
| DE | 10335046 A1 | | 2/2005 | |
| DE | 19742408 B4 | | 4/2006 | |
| DE | 102007042668 B4 | | 7/2015 | |
| EP | 1245447 B1 | | 5/2004 | |
| EP | 1479560 A1 | | 11/2004 | |
| EP | 1281576 B1 | | 4/2006 | |
| EP | 1590205 B1 | | 6/2006 | |
| EP | 1818212 A2 | | 8/2007 | |
| FR | 2791622 A1 | | 10/2000 | |
| JP | 2006205756 A | * | 8/2006 | ........... B60N 2/0232 |
| JP | 2006290227 A | | 10/2006 | |
| JP | 2007022259 A | | 2/2007 | |
| JP | 2008087728 A | | 4/2008 | |
| JP | 4538741 B2 | | 9/2010 | |
| JP | 5131445 B2 | | 1/2013 | |
| JP | 2015223850 A | | 12/2015 | |
| KR | 100457911 B1 | | 11/2004 | |
| KR | 20040097970 A | | 11/2004 | |
| KR | 100586179 B1 | | 7/2006 | |
| KR | 101865763 B1 | * | 6/2018 | ............... B60R 7/04 |
| WO | 2001083266 A1 | | 11/2001 | |
| WO | 2002096712 A1 | | 12/2002 | |
| WO | 2003089265 A1 | | 10/2003 | |
| WO | 2004020249 A2 | | 3/2004 | |

OTHER PUBLICATIONS

First Office Action from the State Intellectual Property Office of the People's Republic of China for CN Patent Application No. 201810749195.8 (English translation) (7 pages).

Supplementary Search from the State Intellectual Property Office of the People's Republic of China for CN Patent Application No. 201810749195.8 (English translation) (2 pages).

Second Office Action from the State Intellectual Property Office of the People's Republic of China for CN Patent Application No. 201810749195.8 (English translation) (7 pages).

Extended European Search Report from the European Patent Office for EP Patent Application No. 19833606.7 dated Nov. 4, 2021 (in English) (7 Pages).

International Search Report and Written Opinion from the International Searching Authority for International Patent Application No. PCT/CN2019/095117 dated Oct. 10, 2019 (English Translation) (11 Pages).

* cited by examiner

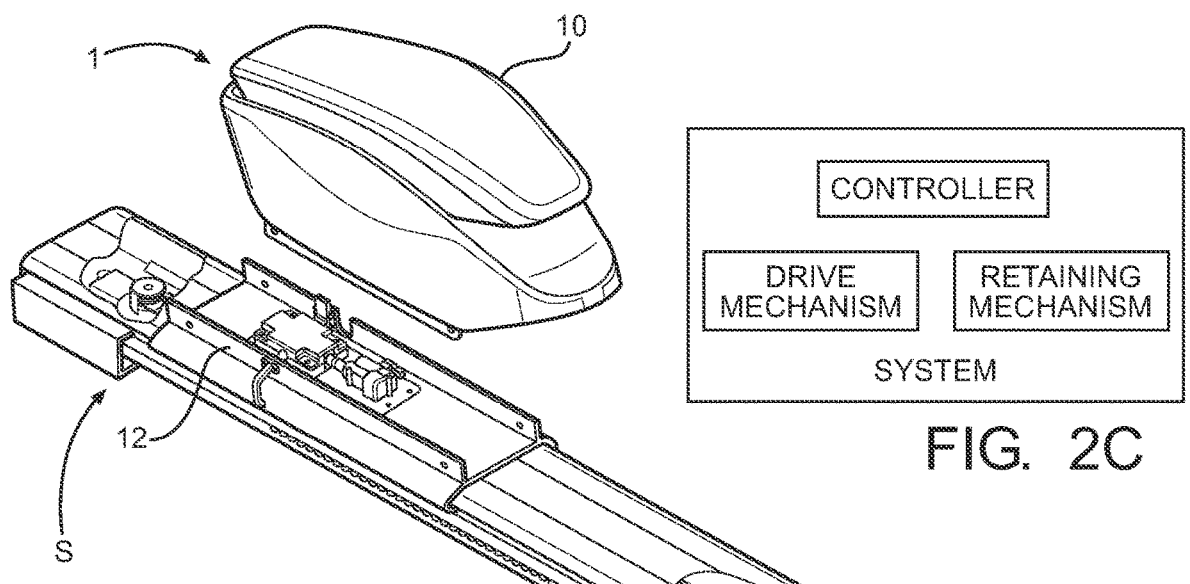
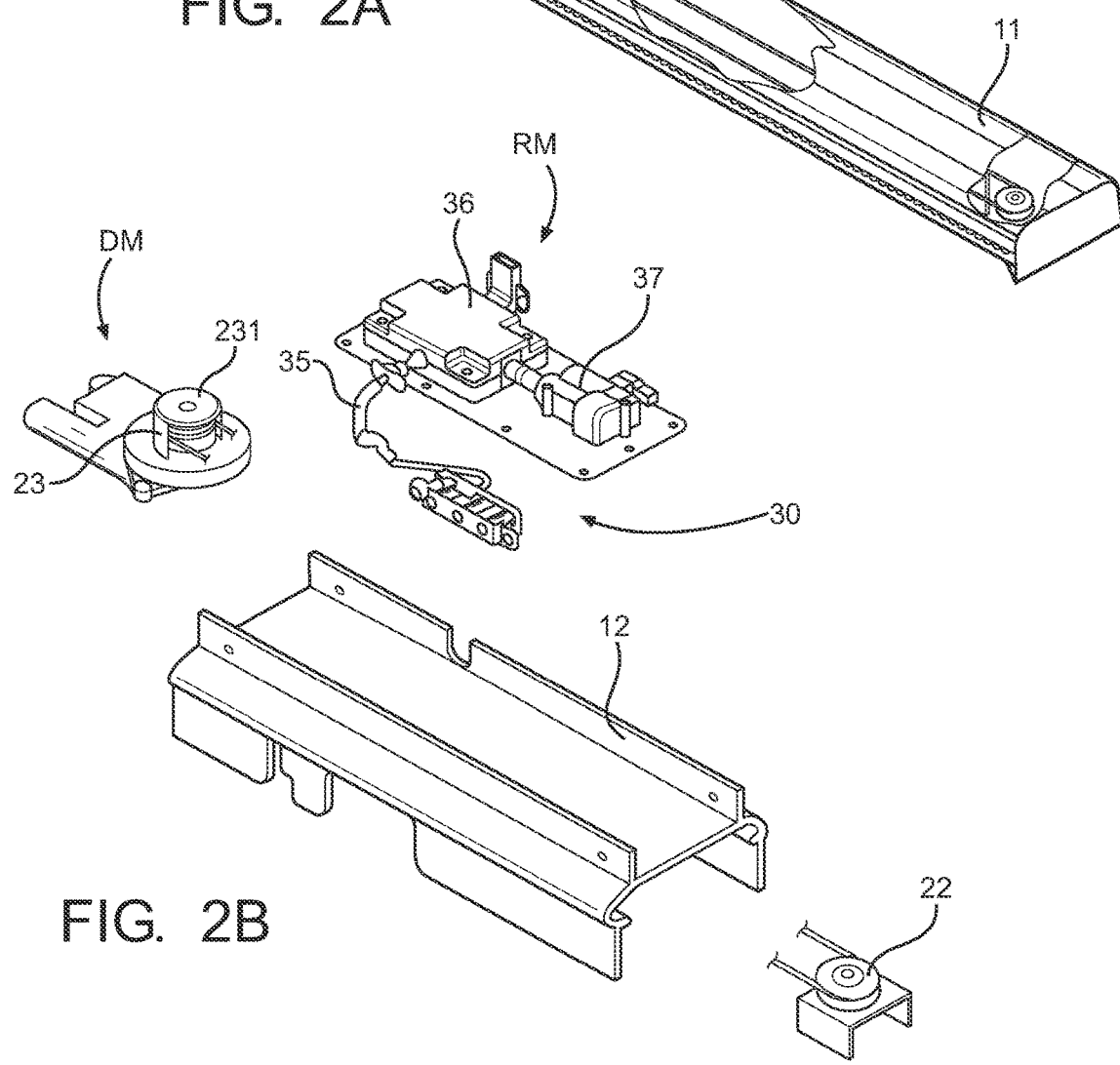
FIG. 2C
FIG. 2A
FIG. 2B

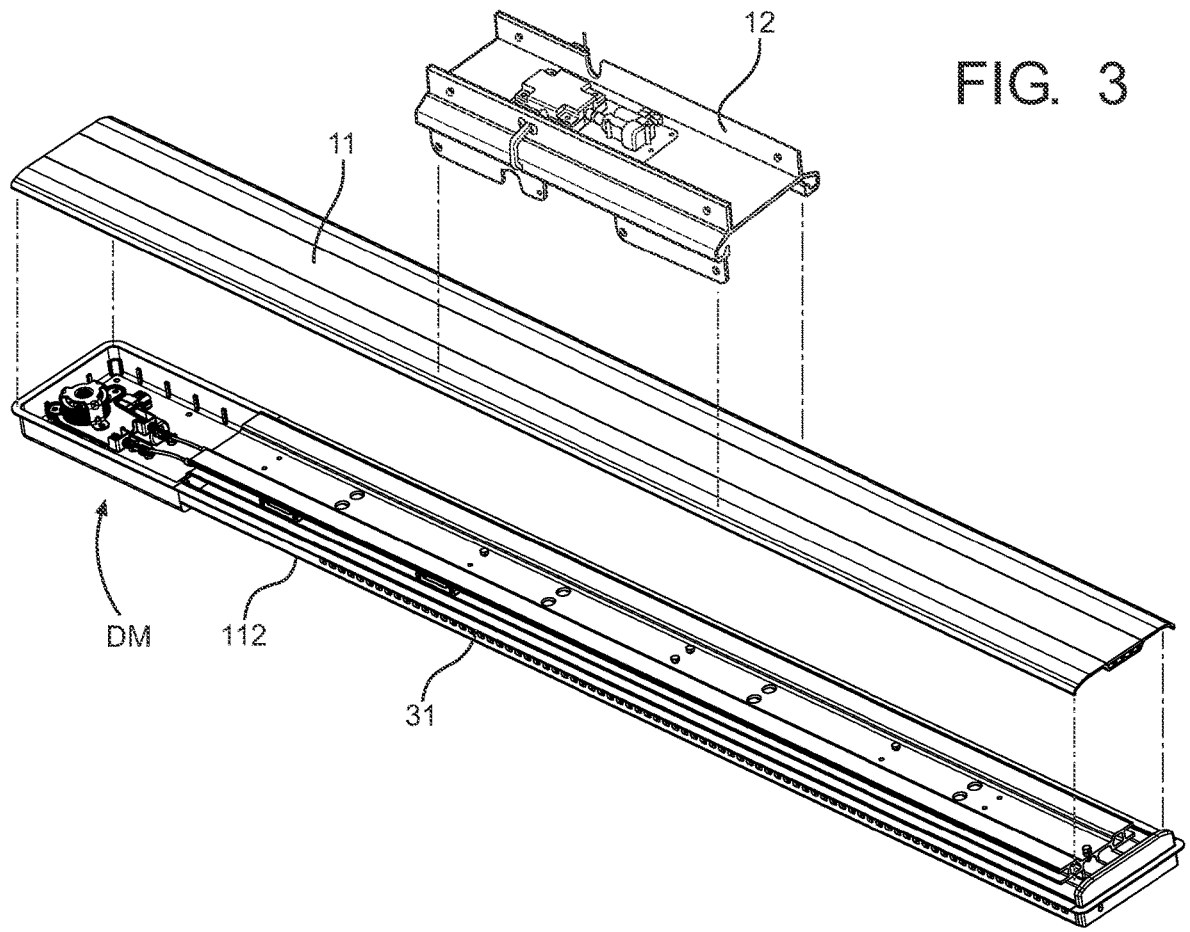
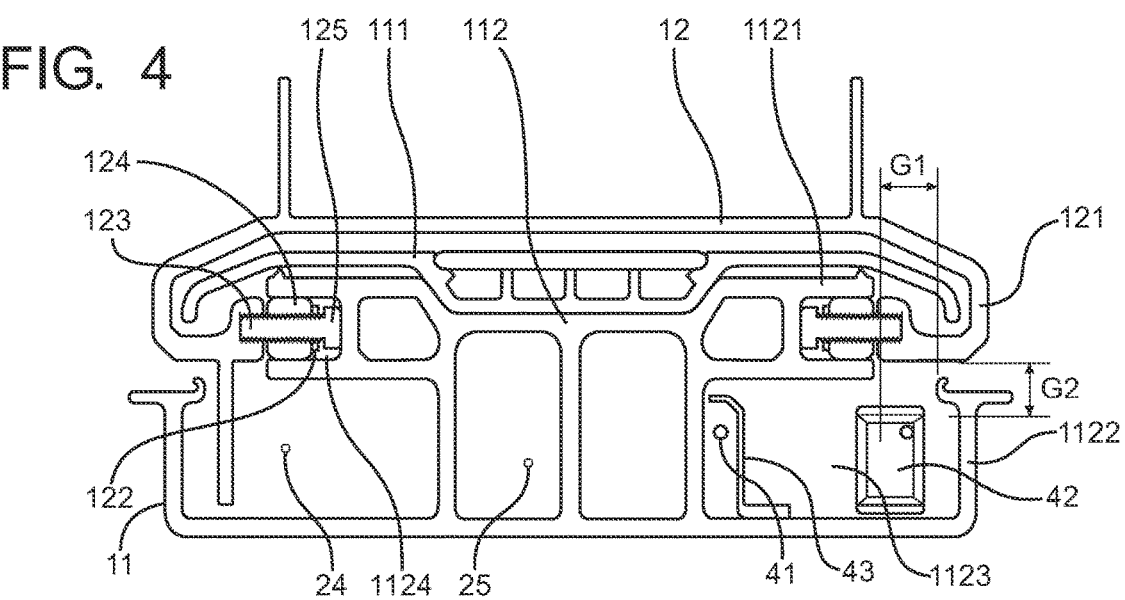

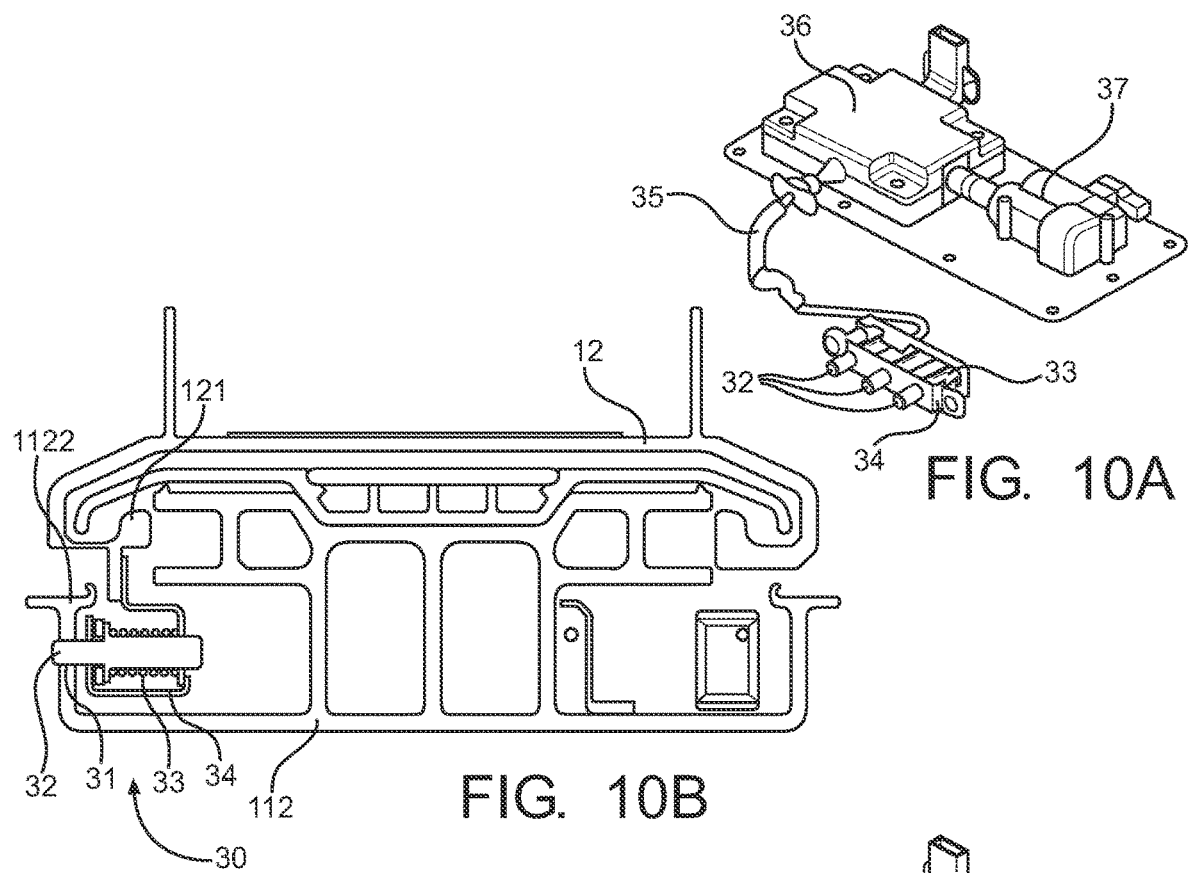
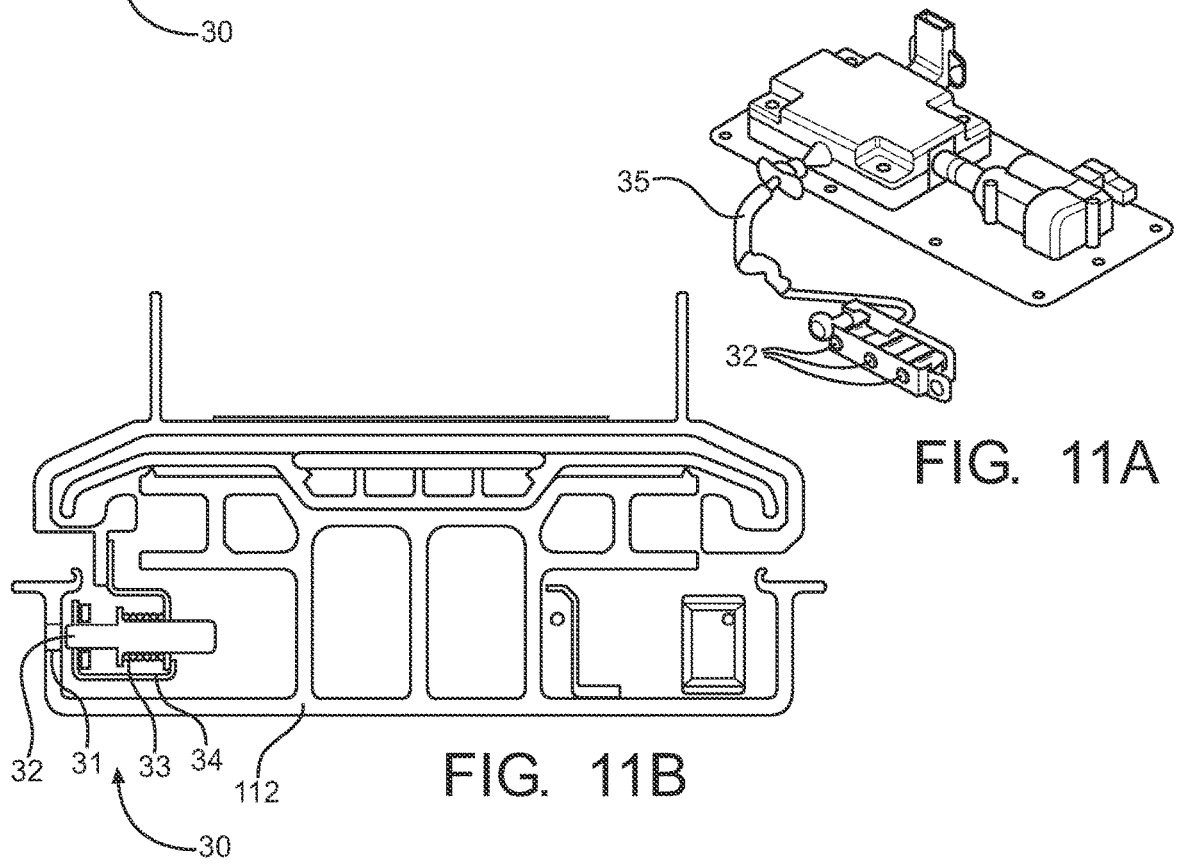

VEHICLE INTERIOR COMPONENT

CROSS-REFERENCE TO RELATED APPLICATIONS

The present application is a continuation of PCT/International Patent Application No. PCT/CN2019/095117 titled "VEHICLE INTERIOR COMPONENT" filed Jul. 8, 2019, which claims priority to Chinese Patent Application No. 201810749195.8 filed Jul. 10, 2018.

The present application claims priority to and incorporates by reference in full the following patent applications: (a) Chinese Patent Application No. 201810749195.8 filed Jul. 10, 2018; (b) PCT/International Patent Application No. PCT/CN2019/095117 titled "VEHICLE INTERIOR COMPONENT" filed Jul. 8, 2019.

FIELD

The present invention relates to a vehicle interior component.

BACKGROUND

It is known to provide a console in a vehicle interior configured to move along a track between a front position and a rear position.

It would be advantageous to provide an improved vehicle interior component.

SUMMARY

The present invention relates to a vehicle interior component comprising a track; a console configured to move along the track; a drive mechanism configured to move the console along the track between a forward position and a rearward position; and a retaining mechanism configured to retain position of the console relative to the track. The console may be configured for (a) an engaged state with position retained relative to the track and (b) a disengaged state with position movable relative to the track. The retaining mechanism may be configured to provide (a) the engaged state for the console and (b) the disengaged state for the console. The drive mechanism may comprise a motor and at least one cable. The at least one cable may comprise a first cable configured to engage the console for movement toward the forward position and a second cable configured to engage the console for movement toward the rearward position. The drive mechanism may comprise a pulley; the pulley may be configured to engage the at least one cable. The component may comprise a controller configured to operate the drive mechanism and the retaining mechanism. The controller may be configured for operation of a motor; operation of the motor by the controller may comprise operation at a speed within a threshold for speed indicating movement of the console is not obstructed. The retaining mechanism may comprise an actuator configured for actuation of a projection into an aperture of the track to secure position of the console relative to the track for the engaged state. The actuator may comprise a slider and a lever; the lever may be configured to move the projection to disengage from an aperture of the track in response to movement of the slider. The retaining mechanism may comprise a set of pins configured to engage a set of holes in the track; at least one hole of the set of holes may comprise a generally elongated shape. The retaining mechanism may comprise a set of pins comprising a center distance between two adjacent pins; the retaining mechanism may comprise a set of holes comprising a center distance between two adjacent holes; a minimum of the center distance between two adjacent pins may be no less than the center distance between two adjacent holes; a maximum of the center distance between two adjacent pins may be no greater than the center distance between two adjacent holes. The component may comprise a controller; the retaining mechanism may comprise an actuator and a lock mechanism; the controller may be configured to send a signal to the actuator to actuate the lock mechanism to set the state of the console to the disengaged state, send a signal to the drive mechanism to move the console and send a signal to the actuator to actuate the lock mechanism to set the state of the console to the engaged state.

The present invention relates to a component system for installation in an interior of a vehicle comprising a track configured for installation in the interior of the vehicle; a component configured for movement along the track; a controller configured to control the component; a drive mechanism configured for an engaged state to move the component along the track under control of the controller; and a retaining mechanism configured for an engaged state to retain the component in a position under control of the controller. Control of the component may comprise actuation of the retaining mechanism into the engaged state of the retaining mechanism to retain the component in position relative to the track. Control of the component may comprise operation of the drive mechanism to the engaged state of the drive mechanism and the retaining mechanism to a disengaged state for movement of the component along the track. The controller may be configured to engage the retaining mechanism when the component is stopped relative to the track; the controller may be configured to disengage the retaining mechanism when the drive mechanism is actuated to move the component along the track. The drive mechanism may comprise a cable drive mechanism driven by a motor. The controller may be configured to stop motion of the component at a threshold speed of a motor of the drive mechanism. The retaining mechanism may comprise at least one projection driven by an electronically-controlled actuator. The retaining mechanism may comprise a set of projections configured to engage a set of apertures; a locked position of the component may comprise engagement of the set of projections in the set of apertures; the component may be configured for movement relative to the track upon disengagement of the set of projections from the set of apertures. The drive mechanism may comprise a motor; the component may be configured for movement along the track when the motor of the drive mechanism is actuated and the retaining mechanism is unactuated with the set of projections disengaged from the set of apertures. The retaining mechanism may comprise a pin comprising a generally circular cross section and a hole in the track comprising an elongated hole. The controller may be configured to be operated by an occupant of the vehicle; the component may be configured to move along the track when the controller actuates the drive mechanism at direction of the occupant; the component may be configured to be retained in a locked position relative to the track when the controller actuates the retaining mechanism at direction of the occupant.

The present invention relates to a vehicle interior component comprising a track and a console configured to move along the track; the console may be configured for a latched state secured to the track and an unlatched state moveable relative to the track. The component may comprise a drive mechanism configured to move the console along the track between a forward position and a rearward position. The drive mechanism may comprise a motor and at least one cable. The at least one cable may comprise a first cable configured to move the console toward the forward position and a second cable configured to move the console toward the rearward position. The drive mechanism may comprise a pulley; the at least one cable may be configured to slide relative to the pulley. The component may comprise a controller configured to operate the drive mechanism and a retaining mechanism. The controller may be configured to sense a speed of the motor. The controller may be configured to stop motion of the motor when a threshold speed of the motor is sensed by the controller. The motor may comprise a motor with a worm gear drive. The component may comprise a retaining mechanism configured for a latched position for the latched state of the console and an unlatched position for the unlatched state of the console. The retaining mechanism may comprise a lock mechanism. The retaining mechanism may comprise an actuator configured to move a pin into engagement with a hole in the track to secure the console to the track. The actuator may comprise a slider and a lever; the lever may be configured to move the pin to disengage from a hole in the track in response to movement of the slider. The lock mechanism may comprise a set of pins configured to engage a set of holes in the track. The pins of the set of pins may comprise generally circular cross sections and the holes of the set of holes in the track may comprise elongated holes. The component may comprise a bracket coupled to the console and a drive mechanism comprising a cable; the lock mechanism may be assembled to a first side of the bracket and the cable may be assembled to a second side of the bracket opposite the first side of the bracket. The component may comprise a bracket coupled to the console and configured to slide relative to the track. The component may comprise a wire harness coupled to the bracket. The component may comprise a drag chain configured to guide movement of the wire harness. The component may comprise a drive mechanism, a retaining mechanism and a controller. The retaining mechanism may comprise an actuator and a lock mechanism. The controller may be configured to send a signal to the actuator to actuate the lock mechanism to set the state of the console to the unlatched state, send a signal to the drive mechanism to move the console and send a signal to the actuator to actuate the lock mechanism to set the state of the console to the latched state. The drive mechanism may comprise a motor.

The present invention relates to a vehicle interior component comprising a slide rail assembly, a bracket configured to slide relative to the slide rail assembly and a drive mechanism configured to drive the bracket to slide relative to the slide rail assembly. The drive mechanism may comprise a first cable coupled to the bracket and a second cable coupled to the bracket; the first cable may be configured to pull the bracket in a first direction and the second cable may be configured to pull the bracket in a second direction opposite the first direction. The slide rail assembly may comprise an upper rail and a lower rail. An end of the upper rail and an end of the lower rail may form a gap on a side of the slide rail assembly. The component may comprise a lock mechanism configured to block sliding of the bracket relative to the slide rail assembly; the lower rail may comprise an inner cavity; the lock mechanism may be hidden from view by the inner cavity. The lock mechanism may comprise a set of pins coupled to the bracket and a plurality of holes in the slide rail assembly. A minimum distance between two adjacent pins may be greater than a minimum distance between two adjacent holes in the slide rail assembly and a maximum distance between two adjacent pins may be less than a maximum distance between two adjacent holes in the slide rail assembly. The lock mechanism may comprise a set of springs for the set of pins; at least one pin of the set of pins may be configured to be inserted into a hole in the slide rail assembly in response to a force on a spring of the set of springs. The lock mechanism may comprise a slider and a lever; the lever may be configured to move a pin of the set of pins to disengage from a hole in the slide assembly in response to movement of the slider. The drive mechanism may comprise a motor configured to rotate a reel, the first cable and the second cable may move in response to rotation of the reel. The component may comprise a wire harness coupled to the bracket and coupled to an input. The component may comprise a drag chain coupled to the slide rail assembly and coupled to the bracket. The slide rail assembly may comprise a harness bracket configured to support the wire harness.

A component system for installation in an interior of a vehicle may comprise a track configured for installation in the interior of the vehicle, a component configured for movement along the track, a controller configured to control the component, a drive mechanism configured to move the component along the track under the control of the controller, and a retaining mechanism configured to retain the component in a position under the control of the controller. The component may be configured for a locked state relative to the track when the retaining mechanism is actuated; the component may be configured for movement along the track when the drive mechanism is actuated and the retaining mechanism is unactuated. The controller may be configured to engage the retaining mechanism when the component is stopped relative to the track. The controller may be configured to disengage the retaining mechanism when the drive mechanism is actuated to move the component along the track. The drive mechanism may comprise a motor. The drive mechanism may comprise a cable drive system. The cable drive system may be driven by the motor. The drive mechanism may comprise a pulley system. The drive mechanism may comprise a pulley system comprising a first pulley driven by the motor. The pulley system may comprise a second pulley. The retaining mechanism may comprise an actuator. The lock mechanism may comprise at least one projection driven by the actuator. The retaining mechanism may comprise a lock mechanism. The lock mechanism may comprise at least one projection configured to engage at least one aperture. The component may be configured for a locked state relative to the track when the retaining mechanism is actuated by engagement by at least one projection with at least one aperture. The lock mechanism may comprise a set of projections configured to engage a set of apertures. The component may comprise the set of projections. The track may comprise the set of apertures. The locked state of the component may comprise engagement of the set of projections in the set of apertures of the lock mechanism of the retaining mechanism. The component may be configured for movement relative to the track upon disengagement of the set of projections from the set of apertures of the lock mechanism of the retaining mechanism. The drive mechanism may comprise a motor; the component may be configured for movement along the track when the motor of the drive mechanism is actuated and the retaining mechanism is unactuated with the set of projections disengaged from the set of apertures. The component may be configured to move along the track when the controller actuates the drive mechanism at direction of an occupant of the vehicle. The component may be configured to be retained in the locked state relative to the track when the controller actuates the retaining mechanism at direction of an occupant of the vehicle.

FIGURES

FIG. 2A is a schematic exploded perspective cut-away view of a vehicle interior component shown as a sliding floor console according to an exemplary embodiment.

FIG. 2B is a schematic exploded partial perspective view of a vehicle interior component shown as a sliding floor console according to an exemplary embodiment.

FIG. 2C is a schematic block diagram of a system of a vehicle interior component according to an exemplary embodiment.

FIG. 3 is a schematic exploded partial perspective view of a vehicle interior component shown as a sliding floor console according to an exemplary embodiment.

FIG. 4 is a schematic section view of a vehicle interior component shown as a sliding floor console according to an exemplary embodiment.

FIG. 10A is a schematic partial perspective view of a lock mechanism for a vehicle interior component according to an exemplary embodiment.

FIG. 10B is a schematic partial section view of a vehicle interior component shown as a sliding floor console according to an exemplary embodiment.

FIG. 11A is a schematic partial perspective view of a lock mechanism for a vehicle interior component according to an exemplary embodiment.

FIG. 11B is a schematic partial section view of a vehicle interior component shown as a sliding floor console according to an exemplary embodiment.

DESCRIPTION

Figure 1A:
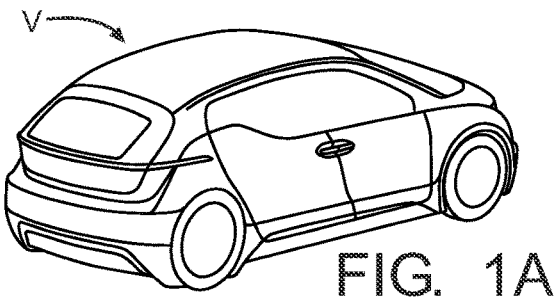
FIG. 1A is a schematic perspective view of a vehicle according to an exemplary embodiment.
Figure 1B:
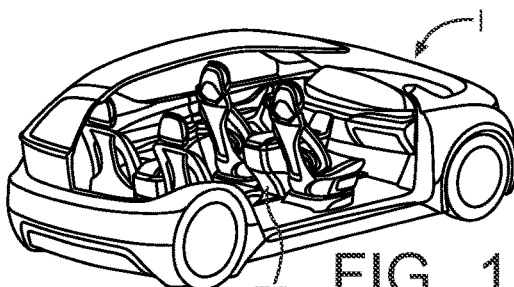
FIG. 1B is a schematic perspective cut-away view of a vehicle showing a vehicle interior according to an exemplary embodiment.
Figure 1C:
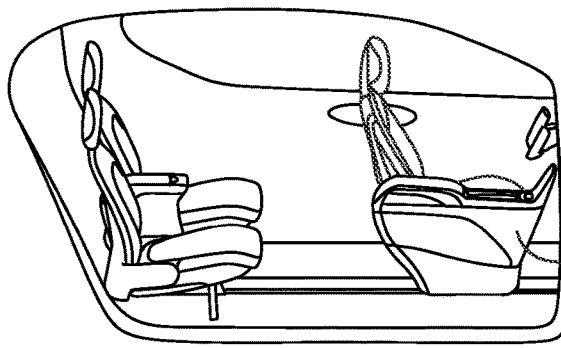
FIGS. 1C through 1F are schematic cut-away plan views of a vehicle showing a vehicle interior according to an exemplary embodiment.
Figure 1D:
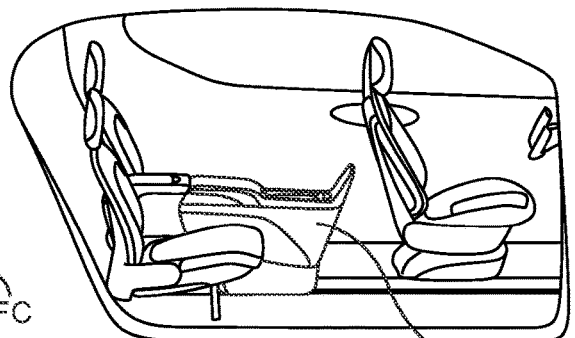
Figure 1E:
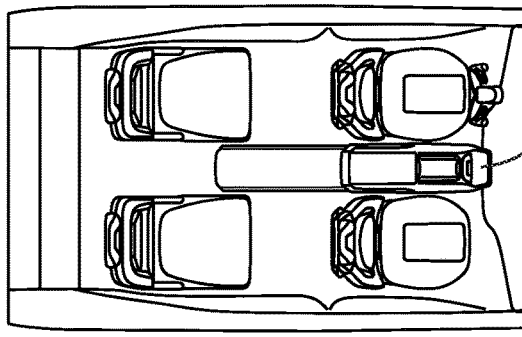
Figure 1F:
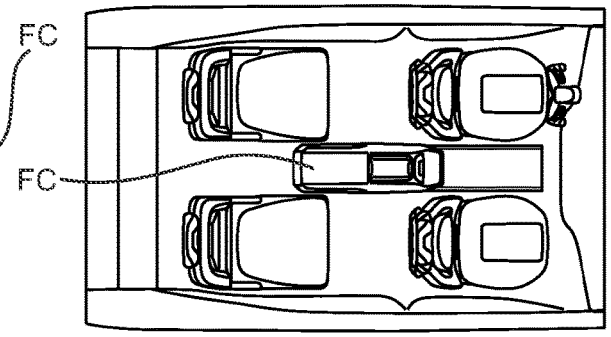
Figure 1G:
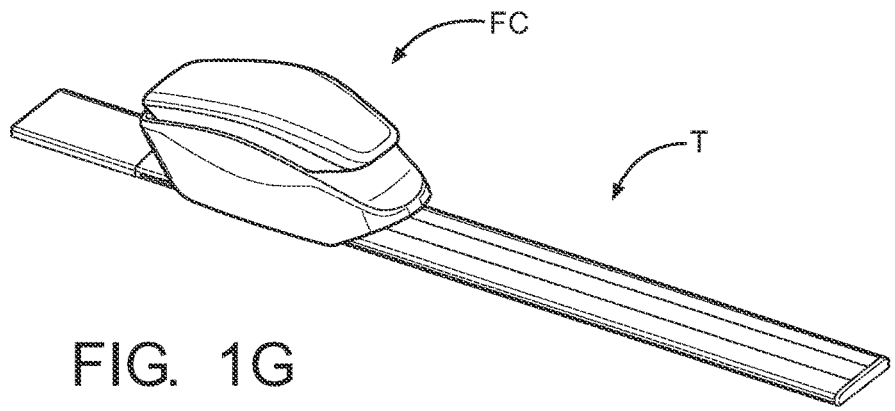
FIG. 1G is a schematic perspective view of a vehicle interior component shown as a sliding floor console according to an exemplary embodiment.
Figure 5:
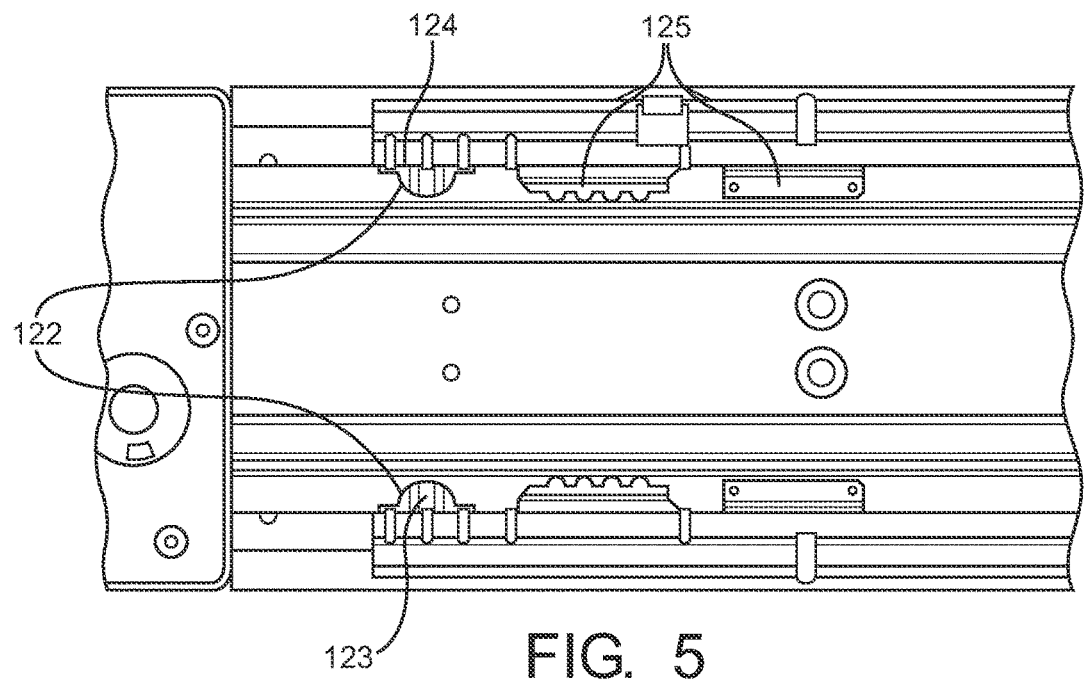
FIG. 5 is a schematic section view of a vehicle interior component shown as a sliding floor console according to an exemplary embodiment.
Figure 6:
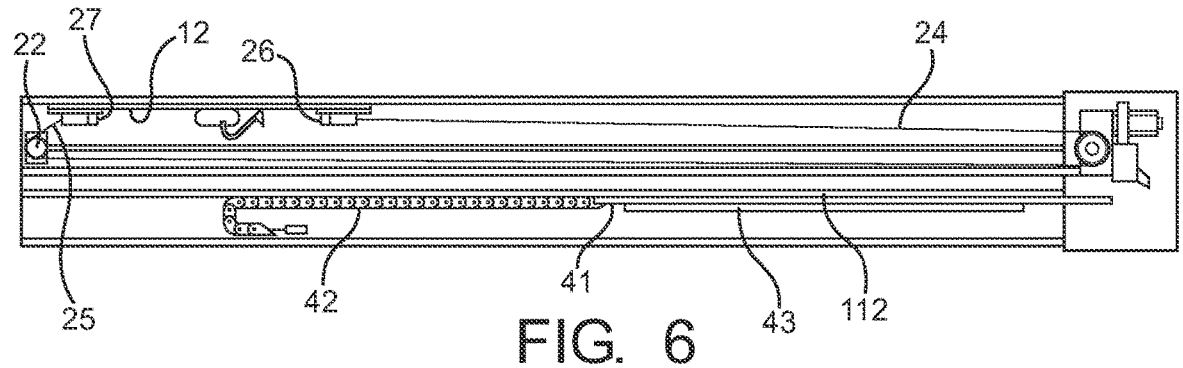
FIGS. 6 and 7 are schematic section views of a vehicle interior component shown as a sliding floor console according to an exemplary embodiment.
Figure 7:
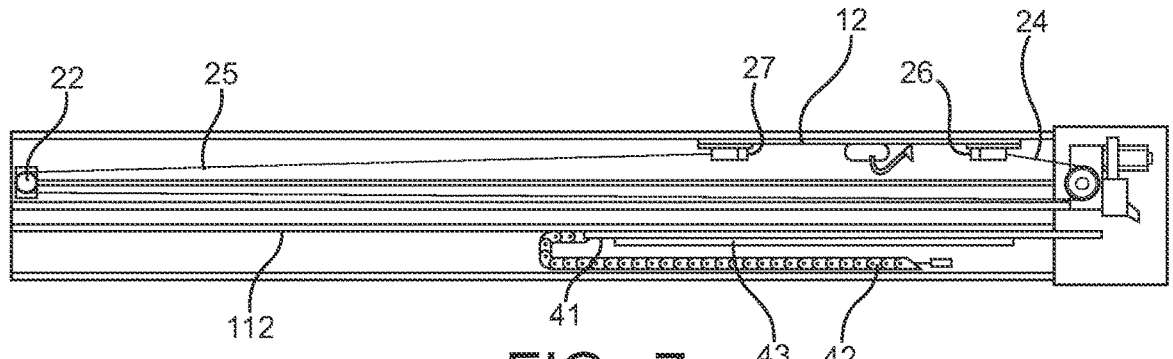
Figure 8:
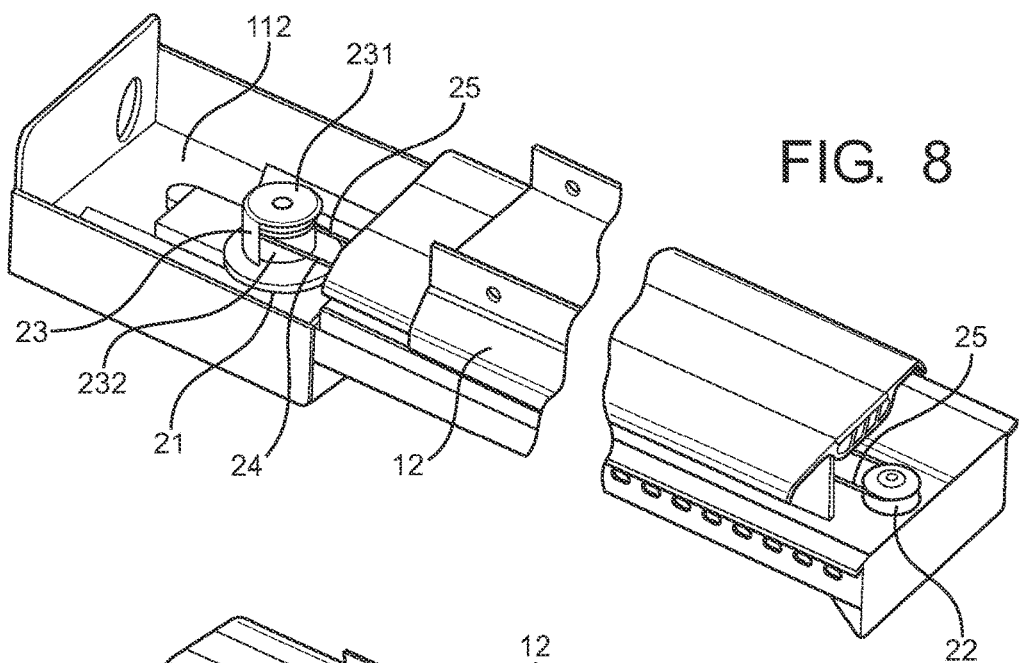
FIG. 8 is a schematic partial perspective cut-away view of a vehicle interior component shown as a sliding floor console according to an exemplary embodiment.
Figure 9A:
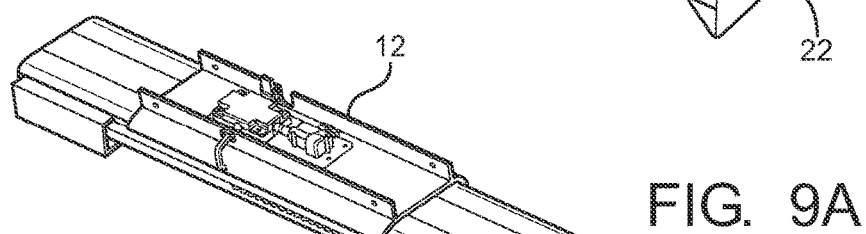
FIGS. 9A through 9C are schematic partial perspective views of a vehicle interior component shown as a sliding floor console according to an exemplary embodiment.
Figure 9B:
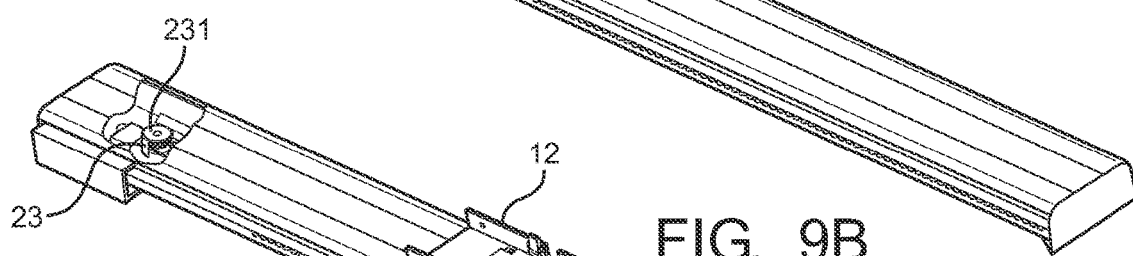
Figure 9C:
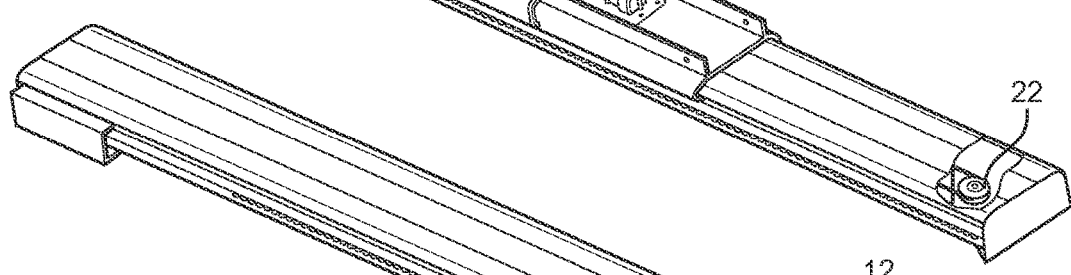

Referring to FIGS. 1A-1B, an interior for a vehicle V is shown with a component/system shown as a console FC (e.g. floor console). As shown schematically according to an exemplary embodiment in FIGS. 1B-1G, the component FC is movable relative to a track T installed in the vehicle interior (e.g. floor console FC movable along a track shown as floor-mounted track T). As shown schematically in FIGS. 1G and 2A-2C, a component/system FC/S may comprise a controller to operate drive mechanism DM and a retaining mechanism RM; drive mechanism DM comprises a motor 21 and a pulley system comprising cable arrangement 24/25 and pullies 22/23 configured to move the component FC along the track T (see also FIGS. 3, 8 and 9A-9C); retaining mechanism RM comprises an actuator 36/37 for a lock mechanism 30 configured to disengage/release and engage/retain the component FC in a position relative to the track (compare FIGS. 10A-10B (engaged/locked/latched) and FIGS. 11A-11B (disengaged/released)).

According to an exemplary embodiment as shown schematically in FIGS. 1A-1G, 2A-2C, 3-8, 9A-9C, 10A-10B, 11A-11B and 12-15 a vehicle interior component FC/1 may comprise a track/rail 112 and a console 10 configured to move along track/rail 112. Console 10 may be configured for a latched state secured to track/rail 112 (as shown schematically in FIGS. 10A and 10B) and an unlatched state moveable relative to the track/rail 112 (as shown schematically in FIGS. 11A and 11B). Component FC/1 may comprise a drive mechanism DM configured to move console 10 along the track/rail 112 between a forward position (as shown schematically in FIGS. 1B, 1C, 1E and 9C) and a rearward position (as shown schematically in FIGS. 1D, 1F, 1G and 9A). The drive mechanism DM may comprise a motor 21 and at least one cable 24/25. The at least one cable may comprise a first cable 24 configured to move console 10 toward the forward position and a second cable 25 configured to move console 10 toward the rearward position. The drive mechanism DM may comprise a pulley 22; the at least one cable may be configured to slide relative to pulley 22. Component FC/1 may comprise a controller configured to operate the drive mechanism DM and a retaining mechanism RM. The controller may be configured to sense a speed of motor 21. The controller may be configured to stop motion of motor 21 when a threshold speed of motor 21 is sensed by the controller. Motor 21 may comprise a motor with a worm gear drive. Component FC/1 may comprise a retaining mechanism RM configured for a latched position (as shown schematically in FIGS. 10A and 10B) for the latched state of console 10 and an unlatched position (as shown schematically in FIGS. 11A and 11B) for the unlatched state of console 10. The retaining mechanism RM may comprise a lock mechanism 30. The retaining mechanism RM may comprise an actuator 36/37 configured to move a pin 32 into engagement with a hole 31 in track/rail 112 to secure console 10 to track/rail 112. The actuator 36/37 may comprise a slider 361 and a lever 362; the lever 362 may be configured to move pin 32 to disengage from a hole 31 in track/rail 112 in response to movement of slider 361. The lock mechanism 30 may comprise a set of pins 32 configured to engage a set of holes 31 in track/rail 112. The pins 32 of the set of pins 32 may comprise generally circular cross sections; the holes 31 in track/rail 112 may comprise elongated holes. Component FC/1 may comprise a bracket 12 coupled to console 10 and a drive mechanism DM comprising a cable; the lock mechanism 30 may be assembled to a first side of bracket 12 and the cable may be assembled to a second side of bracket 12 opposite the first side of bracket 12. Component FC/1 may comprise a bracket 12 coupled to console 10 and configured to slide relative to the track/rail 112. Component FC/1 may comprise a wire harness 41 coupled to bracket 12.

Component FC/1 may comprise a drag chain 42 configured to guide movement of wire harness 41. Component FC/1 may comprise a drive mechanism DM, a retaining mechanism RM and a controller. The retaining mechanism RM may comprise an actuator 36/37 and a lock mechanism 30. The controller may be configured to send a signal to the actuator 36/37 to actuate the lock mechanism 30 to set the state of console 10 to the unlatched state; send a signal to the drive mechanism DM to move console 10; and send a signal to the actuator 36/37 to actuate the lock mechanism 30 to set the state of console 10 to the latched state. The drive mechanism DM may comprise a motor 21. Bracket 12 may comprise a carrier. Bracket 12 may comprise a chassis.

According to an exemplary embodiment as shown schematically in FIGS. 1A-1G, 2A-2C, 3-8, 9A-9C, 10A-10B, 11A-11B and 12-15, a vehicle interior component FC/1 may comprise a slide rail assembly 11, a bracket 12 configured to slide relative to slide rail assembly 11 and a drive mechanism DM configured to drive bracket 12 to slide relative to slide rail assembly 11. The drive mechanism DM may comprise a first cable 24 coupled to bracket 12 and a second cable 25 coupled to bracket 12. First cable 24 may be configured to pull bracket 12 in a first direction and second cable 25 may be configured to pull bracket 12 in a second direction opposite the first direction. Slide rail assembly 11 may comprise an upper rail 111 and a lower rail 112. An end of upper rail 111 and an end of lower rail 112 may form a gap on a side of slide rail assembly 11. Component FC/1 may comprise a lock mechanism 30 configured to block sliding of bracket 12 relative to slide rail assembly 11; lower rail 112 may comprise an inner cavity; the lock mechanism 30 may be hidden from view by the inner cavity. The lock mechanism 30 may comprise a set of pins 32 coupled to bracket 12 and a plurality of holes 31 in slide rail assembly 11. A minimum distance between two adjacent pins 32 may be greater than a minimum distance between two adjacent holes 31 in slide rail assembly 11; a maximum distance between two adjacent pins 32 may be less than a maximum distance between two adjacent holes 31 in slide rail assembly 11. The lock mechanism 30 may comprise a set of springs 33 for the set of pins 32; at least one pin 32 of the set of pins 32 may be configured to be inserted into a hole 31 in slide rail assembly 11 in response to a force on a spring 33 of the set of springs 33. The lock mechanism 30 may comprise a slider 361 and a lever 362; the lever 362 may be configured to move a pin 32 of the set of pins 32 to disengage from a hole 31 in the slide rail assembly 11 in response to movement of slider 361. The drive mechanism DM may comprise a motor 21 configured to rotate a reel 23, first cable 24 and second cable 25 may move in response to rotation of reel 23. Component FC/1 may comprise a wire harness 41 coupled to bracket 12 and coupled to an input. Component FC/1 may comprise a drag chain 42 coupled to slide rail assembly 11 and coupled to bracket 12. Slide rail assembly 11 may comprise a harness bracket configured to support wire harness 41.

According to an exemplary embodiment as shown schematically in FIGS. 1A-1G, 2A-2B, 3-8, 9A-9C, 10A-10B, 11A-11B and 12-15, a component system FC/S for installation in an interior of a vehicle may comprise a track T configured for installation in the interior of the vehicle, a component FC configured for movement along the track T, a controller configured to control the component, a drive mechanism DM configured to move the component along the track under the control of the controller, and a retaining mechanism RM configured to retain the component in a position under the control of the controller. See also FIG. 2C.

As shown schematically, the component may be configured for a locked state relative to the track when the retaining mechanism is actuated; the component may be configured for movement along the track when the drive mechanism is actuated and the retaining mechanism is unactuated. See FIGS. 1C-1G 2C, 9A-9C, 10A-10B and 11A-11B. The controller may be configured to engage the retaining mechanism when the component is stopped relative to the track; the controller may be configured to disengage the retaining mechanism when the drive mechanism is actuated to move the component along the track. See FIGS. 2C, 9A-9C, 10A-10B and 11A-11B.

As shown schematically in FIGS. 2A-2C, 3 and 8, the drive mechanism DM may comprise a motor 21; the drive mechanism may comprise a cable drive system with cable arrangement 24/25; the cable drive system may be driven by the motor. The drive mechanism may comprise a pulley system (e.g. with pullies 22 and 23); the drive mechanism may comprise a pulley system comprising a first pulley 23 driven by the motor; the pulley system may comprise a second pulley 22. See FIGS. 2A-2C, 3, 8 and 9A-9C.

As shown schematically in FIGS. 2A-2C, 10A-10B and 11A-11B, the retaining mechanism RM may comprise an actuator 36/37; the lock mechanism 30 may comprise at least one projection 32 driven by the actuator; the retaining mechanism RM may comprise a lock mechanism 30; the lock mechanism 30 may comprise at least one projection 32 configured to engage at least one aperture 31. As shown schematically, the component FC may be configured for a locked state relative to the track when the retaining mechanism RM is actuated by engagement by at least one projection 32 with at least one aperture 31; the lock mechanism 30 may comprise a set of projections 32 configured to engage a set of apertures 31. See FIGS. 1C-1G, 2C, 10A-10B and 11A-11B. As shown schematically, the component may comprise the set of projections; the track may comprise the set of apertures. See FIGS. 10A-10B and 11A-11B. As shown schematically, the locked state of the component may comprise engagement of the set of projections in the set of apertures of the lock mechanism of the retaining mechanism. See FIGS. 2C, 10A-10B and 11A-11B. As shown schematically in FIGS. 1C-1G and 9A-9C, the component may be configured for movement relative to the track upon disengagement of the set of projections from the set of apertures of the lock mechanism of the retaining mechanism. See also FIGS. 11A-11B.

As shown schematically in FIGS. 2A-2C, 3, 8, 9A-9C, the drive mechanism DM may comprise a motor 21; the component FC may be configured for movement along the track when the motor of the drive mechanism DM is actuated and the retaining mechanism RM is unactuated with the set of projections 32 disengaged from the set of apertures 31. As indicated schematically in FIGS. 1B-1F and 2C, the component may be configured to move along the track when the controller actuates the drive mechanism at direction of an occupant of the vehicle; the component may be configured to be retained in the locked state relative to the track when the controller actuates the retaining mechanism at direction of an occupant of the vehicle. See also FIGS. 1G, 2A-2B, 9A-9C, 10A-10B and 11A-11B.

Exemplary Embodiment

Referring to FIGS. 1A-1G, a vehicle V is shown comprising an interior I with a component shown as a floor console FC comprising a track T according to an exemplary embodiment.

According to an exemplary embodiment as shown in FIG. 3, a vehicle interior component 1 may comprise a track assembly comprising a slide assembly 11 and a bracket 12 coupled to the slide assembly 11 and configured to move relative to the slide assembly 11. Component 1 may further comprise a console 10. The bracket 12 may be coupled to the console 10 so that the console 10 may slide within a vehicle. The slide assembly 11 may comprise an upper rail 111 and a lower rail 112 configured to support the upper rail 111. According to an exemplary embodiment as shown schematically in FIG. 4, the lower rail 112 may comprise an upper portion 1121 and a lower portion 1122 configured to extend horizontally outward at different vertical heights, and an inner chamber 1123 formed by the upper portion 1121 and the lower portion 1122. The upper portion 1121 may comprise a width smaller than the lower portion 1122; the upper portion 1121 and the lower portion 1122 may form a gap G1; the upper rail 111 may cover the upper portion 1121 of the lower rail 112 and the gap G1. An upper end of the upper rail 111 and an end of the lower portion 1122 of the lower rail 112 may form a gap G2. Gap G2 may be hidden from view at any position of the rail assembly 11. The bracket 12 may comprise an inwardly turned curved portion 121 configured to pass through the gap G2 and aligned with an opening 1124 of the lower rail 112. The curved portion 121 may comprise a roller bracket 122; the roller bracket 122 may be fastened to the curved portion 121 (e.g. by screws). The roller bracket 122 may house a roller shaft 123 and a roller 124 configured to rotate around the roller shaft 123. The roller bracket 122 may be inserted into the open slot 1124 of the upper portion 1121 of the lower rail 112; the roller 124 may roll along the open slot 1124 to enable the bracket 12 to slide along the rail assembly 11. According to an exemplary embodiment as shown schematically in FIGS. 4 and 5, the bracket 12 may comprise a set of ribs 125; ribs of the set of ribs 125 may be configured to prevent side to side and vertical movement of the bracket 12 as the bracket 12 moves forward and rearward in the vehicle.

According to an exemplary embodiment as shown schematically in FIGS. 6, 7, 8 and 9A-9C, component 1 may comprise a drive mechanism configured to move the bracket 12 along the slide assembly 11. The drive mechanism may comprise a motor 21 coupled to the lower rail 112. The motor 21 may comprise a worm gear motor. The component 1 may comprise a controller comprising a sensor configured to sense a speed of the motor 21. The controller may control the motor 21. The drive mechanism may comprise a pulley 22 at one end of the lower rail 112 and a reel 23 at the motor 21. Reel 23 may comprise a cap 231 and a shaft 232 connected to the motor 21 and driven by the motor 21. The first cable 24 may be coupled to the shaft 232. A first compression spring 26 may be coupled to one end of the bracket 12. The second cable 25 may be coupled to the cap 231. When the motor 21 drives the reel 23 to rotate clockwise, the first cable 24 may pull the bracket 12 to slide. When the motor 21 drives the reel 23 counterclockwise the second cable 25 may pull the bracket 12 to slide in an opposite direction. A first compression spring 26 and a second compression spring 27 may provide tension during sliding of the bracket 12, absorbing assembly tolerances and preventing looseness.

According to an exemplary embodiment as shown schematically in FIGS. 10A-10B and 11A-11B, component 1 may comprise a lock mechanism configured to prevent the bracket 12 from sliding relative to the slide assembly 11. The lock mechanism may be assembled in the inner cavity 1123 of the lower rail to save space. The lock mechanism may comprise a plurality of holes 31 (see e.g. FIG. 3) in the lower portion 1122 of the lower rail 112. A spring 33 may be fitted over a locking pin 32 and compressed in a lock housing 34. One end of the return spring 33 may abut the lock housing 34. On the inner wall, an end may abut the flange of the lock pin 32, and the lock pin 32 may move between the lock position in the lock hole 31 and the unlocked position which is disengaged from the lock hole 31 through the lock housing 34. To increase increments of adjustment, the locking hole 31 may comprise a slot or an elongated hole, and at least two locking pins 32 may be provided. As shown schematically in FIGS. 14 and 15, the lock mechanism may comprise three lock pins 32; the holes 31 may comprise slots; a third cable 35 may be coupled to the lock pin 32 and to the actuator 36 mounted on the bracket 12. A control actuator 37 may be coupled to the actuator 36 and may drive the actuator 36 to move when the electronically controlled actuator 37 is energized.

Figure 12:
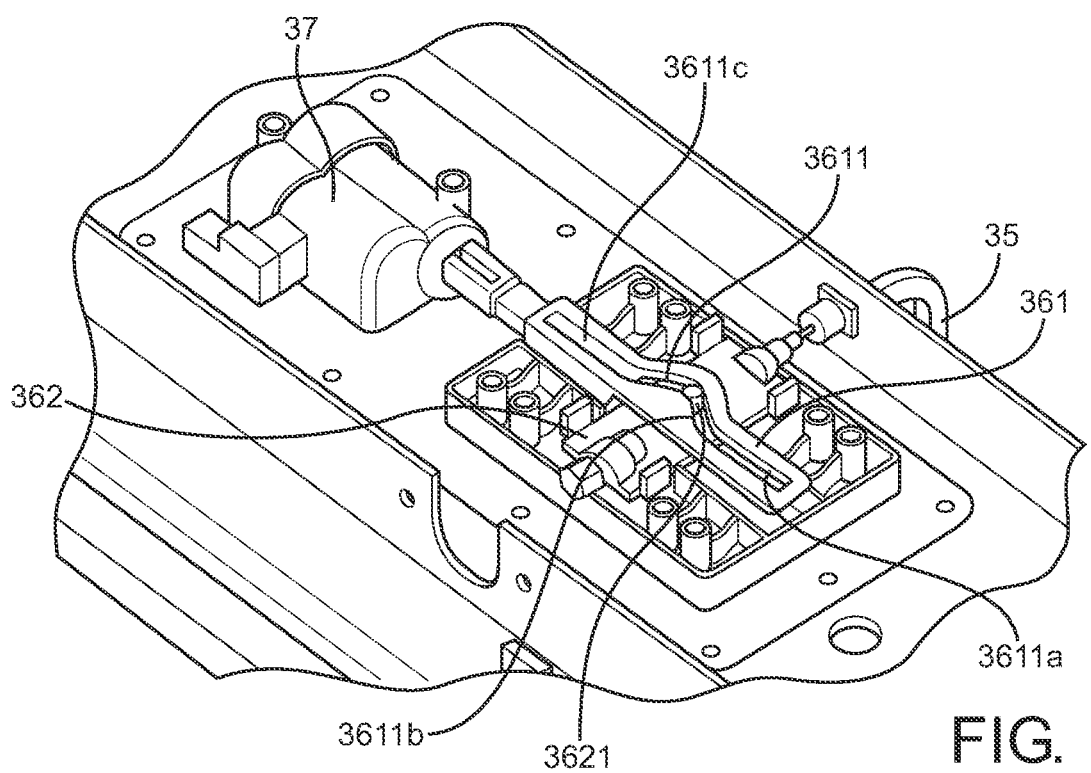
FIGS. 12 and 13 are schematic partial cut-away perspective views of a vehicle interior component shown as a sliding floor console according to an exemplary embodiment.

According to an exemplary embodiment as shown schematically in FIG. 12, the actuator 36 may comprise a slider 361 configured to move generally parallel to the bracket 12 and a lever 362 configured to move generally perpendicular to the bracket 12 in response to the movement of the slider 361. Slider 361 may comprise a lock slider; lever 362 may comprise a lock lever.

The slider 361 may be coupled to the electronically controlled actuator 37, and the lever 362 may be coupled to the third cable 35. The slider 361 may comprise a sliding slot 3611. The sliding slot 3611 may comprise a first linear groove 3611a, a V-shaped groove 3611b and a second linear groove 3611c. The V-shaped groove 3611b may be located between the first linear groove 3611a and the second linear groove 3611c. The V-shaped groove 3611b may comprise a curved groove (e.g. a circular arc or a U-shape). The lock bar 362 may comprise a pin 3621 configured for insertion into the sliding groove 3611. When the slider 361 is driven by the electronically controlled actuator 37 to move parallel to the bracket 12, the pin 3621 may be driven along the slot 3611. The lever 362 may move generally perpendicular to the moving direction of the slider 361 in response to the movement of the lock slider 361.

Figure 13:
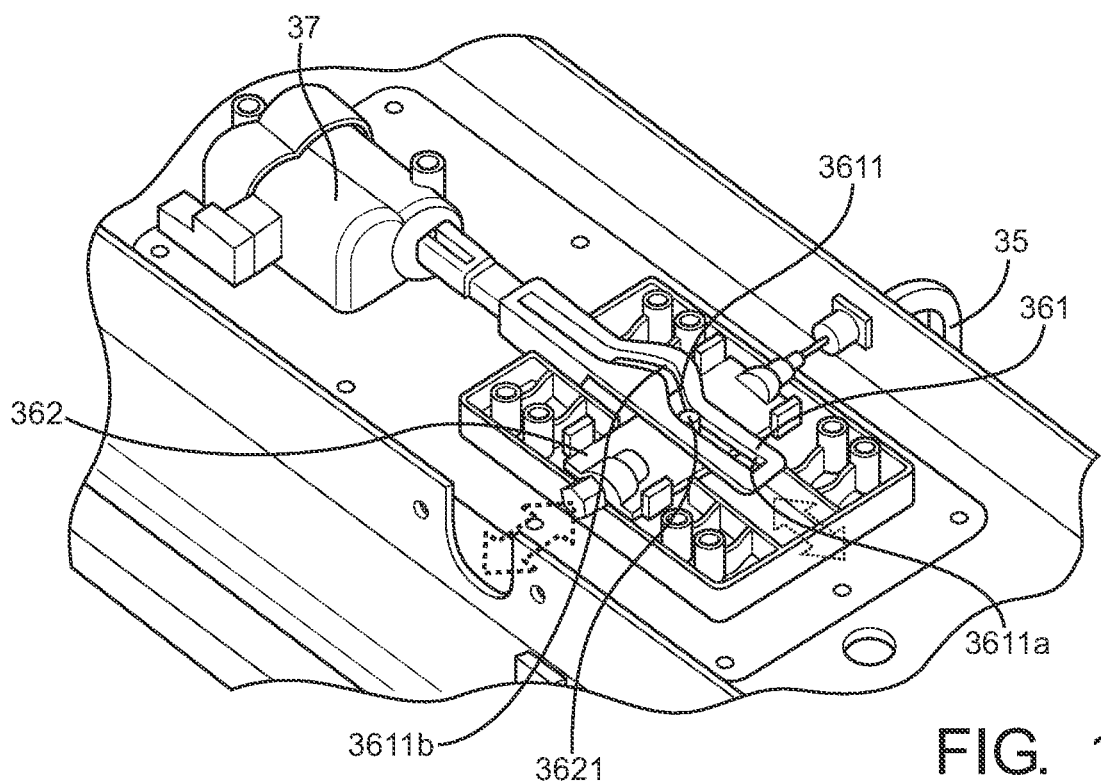
Figure 14:
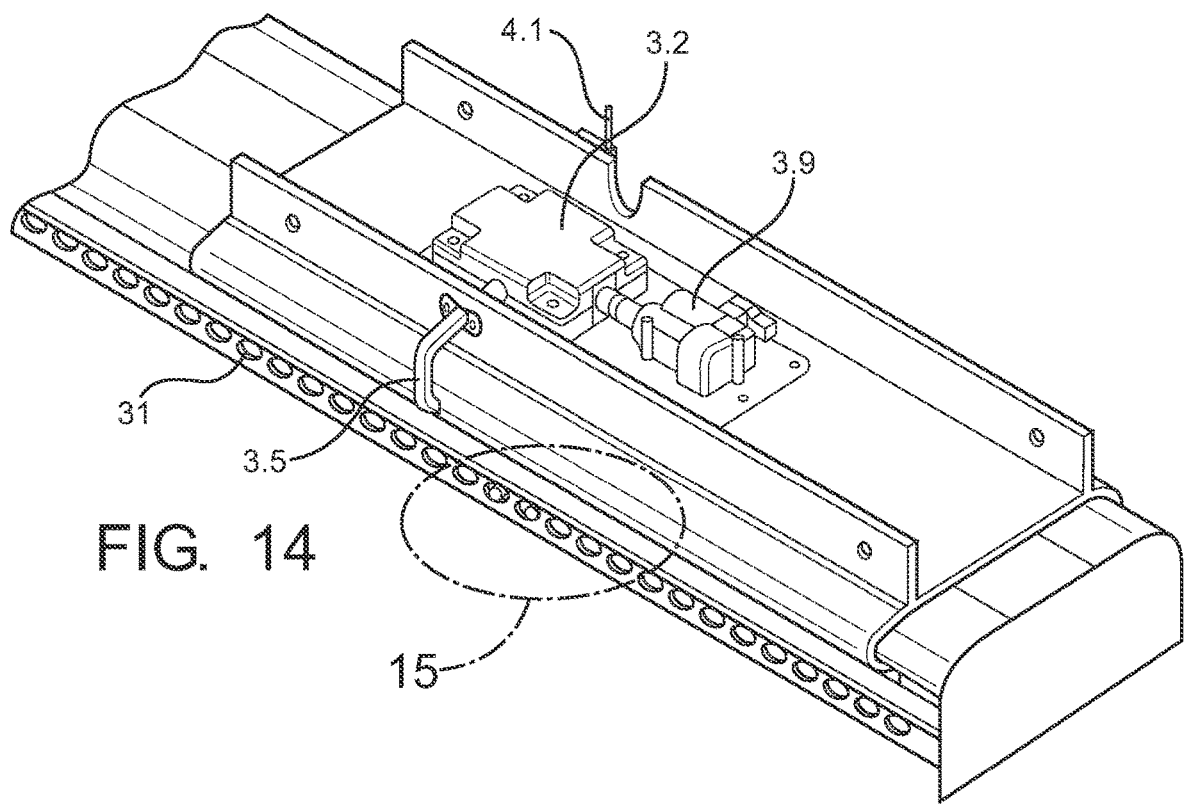
FIGS. 14 and 15 are schematic partial cut-away perspective views of a vehicle interior component shown as a sliding floor console according to an exemplary embodiment.
Figure 15:
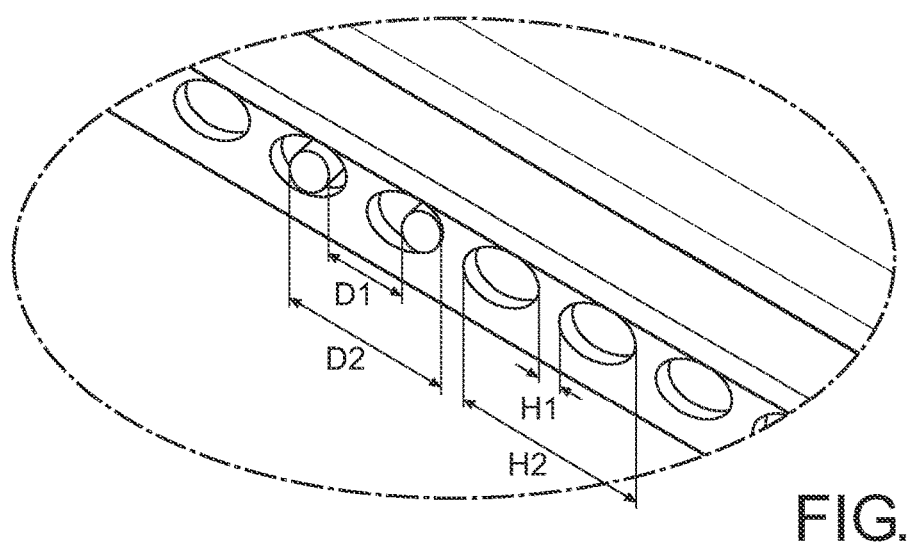

According to an exemplary embodiment as shown schematically in FIGS. 12 and 13, the bracket 12 may be locked (see FIG. 12) and unlocked (see FIG. 13). As shown schematically in FIG. 12, when the bracket is locked, the pin 3621 may be in the V-groove of the slot 3611. At the inflection point of 3611b, the third cable 35 connected to the lever 362 may be in a slack state, and the lock pin 32 may be inserted into the lock hole 31 by the return spring 33, so that the bracket 12 cannot slide relative to the slide assembly 11. When the electronically controlled actuator 37 is energized causing the slider 361 to move, the pin 3621 may move from the inflection point of the V-shaped groove 3611b to the first linear groove 3611a. As shown schematically in FIG. 13, the lever 362 may pull the third cable 35, the third cable 35 may pull the lock pin 32 out of the lock hole 31 to unlock the bracket 12 so that the bracket 12 may slide along the slide assembly 11. When the bracket 12 stops with the center console reaching a target position, the electronically controlled actuator 37 may be energized in the reverse direction to move the slider 361, and the pin 3621 may be returned from the first linear groove 3611a to the V-shaped groove 3611b. The lock pin 32 may be reinserted into the lock hole 31 by the spring 33.

If movement of the center console is obstructed during sliding of the bracket 12 relative to the rail assembly 11 resulting in a drop of motor speed to a set value, the controller may stop the motor 21. A minimum distance D1 between the adjacent two locking pins 32 may be greater than the minimum distance H1 between two adjacent holes 31. A maximum distance D2 between two adjacent locking pins 32 may be smaller than a maximum distance H2 between two adjacent holes 31. When the bracket 12 is locked relative to the rail assembly 11, at least one of the plurality of locking pins 32 may be inserted into a hole 31. The lock mechanism may maintain the center console in a position in response to an external force.

According to an exemplary embodiment as shown schematically in FIG. 4, component 1 may comprise a wire harness 41. The wire harness 41 may be configured to transmit electric power and at least one signal. Component 1 may comprise a drag chain 42 and harness holder 43. The wire harness 41, the drag chain 42 and the harness holder 43 may be assembled in the inner cavity 1123 of the lower rail 112. According to an exemplary embodiment as shown schematically in FIGS. 6 and 7, the harness holder 43 may be coupled to the lower rail 112 and configured to support the wire harness 41; one end of the drag chain 42 may be coupled to the lower rail 112 of the slide assembly 11; the other end of the drag chain 42 may be configured to slide. An end of the wire harness 41 may be coupled to an input, another end of the wire harness 41 may be coupled to the bracket 12 and configured to input a control signal to the sliding center console. The drag chain 42 and the wire harness 41 may be configured to follow movement of the bracket 12. The drag chain 42 may be configured to provide a minimum turning radius of the wire harness 41 to minimize fatigue of the wire harness 41.

According to an exemplary embodiment, a vehicle interior component 1 may comprise a track assembly comprising a slide assembly 11, a bracket 12 coupled to the slide assembly 11, and a driving mechanism configured to drive the bracket 12 to slide relative to the slide assembly 11. The driving mechanism may comprise a first cable 24 coupled to the bracket 12 and a second cable 25 coupled to the bracket 12. The first cable 24 may pull the bracket 12 to slide in a first direction, and the second cable 25 may pull the bracket 12 to slide in a second direction generally opposite to the first direction. The slide assembly 11 may comprise an upper rail 111 and a lower rail 112. An end of the upper rail 111 and an end of the lower rail 112 may form a Z-direction gap on a side of the slide assembly 11. The lower rail 112 may comprise an inner cavity 1123 for a lock mechanism configured to block sliding of the bracket 12 relative to the slide assembly 11. The lock mechanism may comprise a plurality of lock pins 32 coupled to the bracket 12 and a plurality of lock holes 31 on the slide assembly 11. A minimum distance between two adjacent lock pins 32 may be greater than a minimum distance between adjacent two lock holes 31; a maximum distance between two adjacent lock pins 32 may be less than a maximum distance between two adjacent lock holes 31. The lock mechanism may comprise a reset spring 33 on the lock pin 32; at least one of the lock pins 32 may be inserted into the lock hole 31 in response to a force of the reset spring 33. The lock mechanism may comprise an actuator 36 comprising a slider 361 and a lever 362; the lever 362 may drive the lock pin 32 to disengage from the lock hole 31 in response to movement of the slider 361. The driving mechanism may comprise a motor 21 coupled to the slide assembly 11; the motor 21 may drive a reel 23 to rotate; the first cable 24 and the second cable 25 may move respectively in response to rotation of the reel 23. The motor 21 may comprise a worm gear motor. The component may comprise a controller, the controller may comprise a wire harness 41 coupled to the bracket 12 and an input. The wire harness may be surrounded by a drag chain 42; the drag chain 42 may be coupled to the slide assembly 11 and the bracket 12. The slide assembly 11 may comprise a bracket 43 configured to support the wire harness 41.

According to an exemplary embodiment, the component may comprise a sliding center console configured to lock in multiple positions.

According to an exemplary embodiment, the drive mechanism may monitor speed of the motor under different load conditions; the controller may prevent a pinch condition when the component encounters obstacles. The component may automatically stop or return a distance in response to a signal from the controller. The lock mechanism may lock the center console on the rail assembly in the event of an impact. A gap between the rails may be configured to be hidden from view.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A vehicle interior component comprising:
a track;
a console configured to move along the track;
a drive mechanism configured to move the console along the track between a forward position and a rearward position; and
a retaining mechanism configured to retain position of the console relative to the track;
wherein the console is configured for (a) an engaged state with position retained relative to the track and (b) a disengaged state with position movable relative to the track;
wherein the retaining mechanism is configured to provide (a) the engaged state for the console and (b) the disengaged state for the console;
wherein the drive mechanism comprises a motor and at least one cable;
wherein the at least one cable comprises a first cable configured to engage the console for movement toward the forward position and a second cable configured to engage the console for movement toward the rearward position.

2. The component of claim 1 wherein the drive mechanism comprises the motor and a pulley system configured to engage the at least one cable.

3. The component of claim 2 wherein the pulley system is configured to engage the first cable and the second cable.

4. The component of claim 2 wherein the pulley system of the drive mechanism comprises a pulley; wherein the pulley is configured to engage the at least one cable.

5. The component of claim 1 further comprising a controller configured to operate the drive mechanism and the retaining mechanism.

6. The component of claim 5 wherein the controller is configured for operation of a motor; wherein operation of the motor by the controller comprises operation at a speed within a threshold for speed indicating movement of the console is not obstructed.

7. The component of claim 1 wherein the retaining mechanism comprises an actuator configured for actuation of a projection into an aperture of the track to secure position of the console relative to the track for the engaged state.

8. The component of claim 7 wherein the actuator further comprises a slider and a lever; wherein the lever is configured to move the projection to disengage from an aperture of the track in response to movement of the slider.

9. The component of claim 1 wherein the retaining mechanism comprises a set of pins configured to engage a set of holes in the track; wherein at least one hole of the set of holes comprises a generally elongated shape.

10. The component of claim 1 wherein the retaining mechanism comprises a set of pins.

11. The component of claim 1 further comprising a controller;
wherein the retaining mechanism comprises an actuator and a lock mechanism;
wherein the controller is configured to:
send a signal to the actuator to actuate the lock mechanism to set the state of the console to the disengaged state;
send a signal to the drive mechanism to move the console; and
send a signal to the actuator to actuate the lock mechanism to set the state of the console to the engaged state.

12. A vehicle interior component comprising:
a track;
a console configured to move along the track;
a drive mechanism configured to move the console along the track between a forward position and a rearward position; and
a retaining mechanism configured to retain position of the console relative to the track;
wherein the console is configured for (a) an engaged state with position retained relative to the track and (b) a disengaged state with position movable relative to the track;
wherein the retaining mechanism is configured to provide (a) the engaged state for the console and (b) the disengaged state for the console;
wherein the drive mechanism comprises a motor and at least one cable;
wherein the drive mechanism comprises a pulley;
wherein the pulley is configured to engage the at least one cable.

13. The component of claim 12 further comprising a pulley system comprising the pulley.

14. The component of claim 12 wherein the retaining mechanism comprises an actuator configured to secure position of the console relative to the track for the engaged state.

15. The component of claim 12 further comprising a controller configured to operate the drive mechanism and the retaining mechanism.

16. A vehicle interior component comprising:
a track;
a console configured to move along the track;
a drive mechanism configured to move the console along the track between a forward position and a rearward position;
a retaining mechanism configured to retain position of the console relative to the track; and
a controller configured to operate the drive mechanism and the retaining mechanism;
wherein the console is configured for (a) an engaged state with position retained relative to the track and (b) a disengaged state with position movable relative to the track;
wherein the retaining mechanism is configured to provide (a) the engaged state for the console and (b) the disengaged state for the console;
wherein the controller is configured for operation of a motor;
wherein operation of the motor by the controller comprises operation at a speed within a threshold for speed indicating movement of the console is not obstructed.

17. A vehicle interior component comprising:
a track;
a console configured to move along the track;
a drive mechanism configured to move the console along the track between a forward position and a rearward position; and
a retaining mechanism configured to retain position of the console relative to the track;
wherein the console is configured for (a) an engaged state with position retained relative to the track and (b) a disengaged state with position movable relative to the track;

wherein the retaining mechanism is configured to provide (a) the engaged state for the console and (b) the disengaged state for the console;

wherein the retaining mechanism comprises an actuator configured for actuation of a projection into an aperture of the track to secure position of the console relative to the track for the engaged state.

18. The component of claim 17 wherein the actuator further comprises a slider and a lever; wherein the lever is configured to move the projection to disengage from an aperture of the track in response to movement of the slider.

19. A vehicle interior component comprising:

a track;

a console configured to move along the track;

a drive mechanism configured to move the console along the track between a forward position and a rearward position; and a retaining mechanism configured to retain position of the console relative to the track;

wherein the console is configured for (a) an engaged state with position retained relative to the track and (b) a disengaged state with position movable relative to the track;

wherein the retaining mechanism is configured to provide (a) the engaged state for the console and (b) the disengaged state for the console;

wherein the retaining mechanism comprises a set of pins configured to engage a set of holes in the track;

wherein at least one hole of the set of holes comprises a generally elongated shape.

* * * * *